United States Patent Office 3,592,929
Patented July 13, 1971

3,592,929
SYNERGISTIC ANTIMICROBIC AGENTS OF TWO BROMONITROALKYL N-PHENYLCARBAMATES
Heinz Gunter Nosler, Monheim, Rhineland, and Richard Wessendorf, Hilden, Rhineland, Germany, assignors to Henkel & Cie. GmbH, Dusseldorf-Holthausen, Germany
No Drawing. Filed July 25, 1968, Ser. No. 747,452
Claims priority, application Germany, Nov. 7, 1967, H 64,376; Dec. 7, 1967, H 64,694
Int. Cl. A01n 9/20
U.S. Cl. 424—204  9 Claims

ABSTRACT OF THE DISCLOSURE

Synergistic antimicrobic compositions comprising as the active ingredient a mixture of 2-bromo-2-nitrobutyl-N-phenylcarbamate and 2-bromo-2-nitrobutyl-N-(3,4-dichlorophenyl)-carbamate.

STATE OF THE ART

Many organic nitro compounds are known to possess antibacterial properties and examples of such compounds are aromatic nitro compounds, nitro-substituted pyridine derivatives, nitrofurfural derivatives, many aliphatic nitro, dinitro and polynitro compounds. Of particular interest as preservatives have been aliphatic nitro alcohols and brominated derivatives thereof due to their broad spectrum of activity. These compounds, however, have the disadvantage of showing signs of decomposition after storage under atmospheric conditions for a short time and they generally have only a low degree of activity which is disadvantageous for impregnating wood and textiles for instance.

Known fungicides include nitro alcohols and esters of nitro alcohols with mono- and polybasic carboxylic acids but these products are only effective against fungi and not against bacteria. Therefore, their limited spectrum is too restricted for general use as antimicrobic agents. Up to now, there has been no reliable known connection between chemical structure and antimicrobic activity. For example, Urbanski in "Nitro Compounds," Warsaw, 1964, page 449 et seq., discloses that ethyl 4-chloro-4,4-dinitro butyrate and 2-bromo-2-nitro-propanediol-1(1,3) have a high activity against micro-organisms while ethyl 4-bromo-4,4-dinitro butyrate and 2-chloro-2-nitro-propanediol-(1,3) are substantially devoid of any such activity.

In copending commonly assigned U.S. patent application Ser. No. 747,453 filed on even date herewith and entitled Novel Antimicrobic Compositions, there are described novel antimicrobic compositions having as the active ingredient, a nitroalkyl-N-phenylcarbamate of the formula

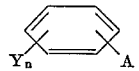

wherein Y is selected from the group consisting of chlorine and nitro, $n$ is a whole number from 0 to 2

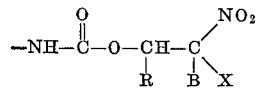

wherein R is selected from the group consisting of hydrogen and methyl, X is selected from the group consisting of hydrogen and bromine and B is selected from the group consisting of hydrogen, methyl, ethyl and a phenylcarbamic acid group of the formula

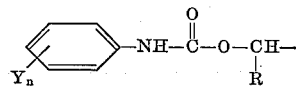

wherein Y, $n$ and R have the above definitions. These compositions are effective at relatively low concentrations.

OBJECTS OF THE INVENTION

It is an object of the invention to provide novel synergistic antimicrobic compositions having a high degree of activity against bacteria and fungi.

It is another object of the invention to provide novel synergistic antimicrobic compositions having a short kill time.

These and other objects and advantages of the invention will become obvious from the following detailed description.

THE INVENTION

The synergistic antimicrobic compositions of the invention are comprised of a mixture of 2-bromo-2-nitrobutyl-N-phenylcarbamate and 2-bromo-2-nitrobutyl-N-(3,4-dichlorophenyl)-carbamate in a weight ratio of 1:4 to 4:1, preferably 1:1. The synergistic increase in activity is evidenced by greater effectiveness against both gram negative and gram positive bacteria and fungi and also by a broader spectrum of activity. The synergistic activity is all the more surprising as no synergistic activity has been observed with mixtures of nitro alcohols, their esters with mono- and polycarboxylic acids and nitroalkyl-N-phenylcarbamates.

The antimicrobic compositions of the invention may be in the form of liquid, pasty or solid preparations such as aqueous suspensions, emulsions, solutions in organic solvents, oils, ointments creams, pencils, powders, soaps, toothpastes and mouthwashes which may be used as cleansing agents, general and special skin-treatment agents and other cosmetic preparations. The synergistic combination of the two bromo-nitrobutyl-N-phenylcarbamates may be used with particular advantage in antimicrobial cleansing, disinfecting and preserving agents for textiles, floors, hospital appliances and instruments, and industrial establishments such as dairies, breweries, and laundries.

Due to their very good antimicrobic activity and improved spectrum of activity, the aforesaid synergistic combination of the two bromonitrobutyl-N-phenylcarbamates is also specially suitable for the preservation of textile, leather and paper adjuvants, adhesives, paints, cutting oils and all kinds of cosmetic preparations. For this purpose, an addition of 0.005 to 0.2% by weight, especially 0.01% by weight, of the synergistic combination is recommended. Amounts as large as 5.0% of the composition may be used, however.

In a modification of the antimicrobic compositions of the invention, synergistic compositions are comprised of an effective amount of a complexing agent having a calcium carbonate binding capacity greater than 230 mg. per gm. of complexing agent in the Hampshire test and the two nitroalkyl-N-phenylcarbamates in a weight ratio of carbamate to complexing agent of 1:1000 to 50:1, depending upon the specific components.

The complexing agent in the compositions of the invention having a calcium carbonate binding capacity of more than 230 mg. in the Hampshire test may belong to varied classes of compounds such as polycarboxylic acids, hydroxy carboxylic acid, aminocarboxylic acids, phosphonic acids and polyphosphonic acids and their alkali metal salts.

The Hampshire method for determining calcium carbonate binding capacity is described in the publication of the Hampshire Chemical Corporation of June 1960, "Hampshire NTA Technical Bulletin," appendix, page A2. In the method, exactly 2 gm. of powdery complexing agent are dissolved in 50 cc. of distilled water after which the solution is neutralized and admixed with 10 ml. of a 2% sodium carbonate solution. The pH is adjusted to 11–12 and the solution is diluted to 100 ml. Then the solution is titrated with a calcium acetate solution containing 44.1 gm. of calcium acetate monohydrate per liter until a distinct and lasting turbidity occurs. The calcium carbonate-binding capacity is determined according to the formula:

$$\frac{\text{cc. calcium acetate solution} \times 25}{\text{weight portion of complexing agent}}$$
= mg. calcium carbonate bound per gm. of complexing agent Another modification of the antimicrobic compositions of the invention to obtain compositions having an extremely short kill time comprises adding to the synergistic mixtures of 2-bromo-2-nitrobutyl-N-phenylcarbamate and 2-bromo-2-nitrobutyl - N - (3,4-dichlorophenyl)-carbamate in a weight ratio of 1:4 to 4:1, dimethylsulfoxide and ethanol or isopropanol which surprisingly improves their activity substantially.

These said antimicrobic compositions are comprised of 5 to 30% by weight of an alcohol selected from the group consisting of ethanol and isopropanol, 10 to 50% by weight of dimethylsulfoxide, 0.005 to 5% by weight of the two nitroalkyl-N-phenylcarbamate and a non-toxic carrier. Preferred amounts of the ingredient are 10 to 20% by weight of the alcohol, 20 to 40% by weight of dimethylsulfoxide and 0.1 to 1.0% by weight of the carbamates.

In the following examples are described several preferred embodiments to illustrate the invention. However, it should be understood that the invention is not intended to be limited to the specific embodiment.

EXAMPLE I 0.1 mole of 2-bromo-2-nitrobutanol was admixed with 0.12 mole of phenylisocyanate in anhydrous benzene and the mixture was heated at reflux for 4 to 5 hours. After distilling off the majority of the benzene, the residue was recrystallized from a 1:1 mixture of petroleum ether and benzene to obtain 2-bromo-2-nitrobutyl-N-phenylcarbamate (agent A) having a melting point of 87° C.

Using the same procedure, 2-bromo-2-nitrobutyl-N-(3,4-dichlorophenyl)-carbamate (B) having a melting point of 79° C. was prepared from 2-bromo-2-nitrobutanol and 3,4-dichlorophenyl isocyanate.

EXAMPLE II

The inhibiting concentrations of synergistic combinations of the two bromonitrobutyl-N-phenylcarbamates A and B were found by the plate test discussed infra and the results are given in Table I. This variation of the dilution test for chemical disinfectants set up by Deutsche Gesellschaft für Hygene und Mikrobiologie has the advantage of using a solid culture media instead of a liquid culture media. Solid culture media have the advantage of being able to easily discern the effectiveness, particularly for fungicides.

The desired test concentrations were prepared by mixing specific amounts of the substance solutions of suitable concentrations with specific amounts of liquid bouillon or beer-wort agars, in sterile petri-dishes. The amounts, measured with a pipette, of the substance solutions were a maximum of 0.1 to 1 ml. and the total volume in the petri-dishes after admixing with the culture media amounted to 10 ml.

After solidification of the culture media, its surface was inoculated with the test germ suspension in bouillon or wort, which contained about $10^\circ$ germs per ml. The incubation took place at 37° C. or at 30° C. in the incubator, and lasted 8 days when bacterial *Candida albicans* was employed. When Epidermophyton Kaufmann Wolf was used, it lasted 21 days. The duration of incubation of 21 days for Epidermophyton Kaufmann-Wolf was chosen to conform to the above standard test, because in the evaluation of disinfectants against fungi of the epithelium, a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in varying concentration intervals.

When the tested antimicrobic composition did not contain alcohol, it was tested in a solution containing acetone. In the following tables, the concentration and the destruction times for the compositions tested are reported.

TABLE I

| Inhibiting conc. in p.p.m. | | | Proportion | |
|---|---|---|---|---|
| Substance A | Substance B | A+B | A:B | Test germ |
| 100 | 25 | 20+5 | 4:1 | *Staphylococcus aureus.* |
|  |  | 10+10 | 1:1 |  |
|  |  | 15+60 | 1:4 | *Escherichia coli.* |
| 100 | 100 | 40+20 | 2:1 |  |
|  |  | 25+25 | 1:1 |  |
| 25 | 50 | 5+5 | 1:1 | *Aspergillus niger.* |
| 25 | 50 | 10+10 | 1:1 | *Penicillium camerunense.* |

TABLE II

| Ingredients in composition | Ingredient percent | Agent mixture (A+B) 1:1 | | | | | | |
|---|---|---|---|---|---|---|---|---|
| | | Sta. aureus | E. coli | Pseudomonas | Candida | Epidermophyt. | Aspergillus | Penicillium |
| Isopropanol | 10 | △ | △ | △ | △ | △ | △ | △ |
|  | 20 | △ | △ | △ | △ | △ | △ | △ |
| Dimethylsulfoxide (DMSO) | 40 | △ | △ | △ | △ | △ | △ | △ |
| Agent mixture | 0.1 | △ | △ | △ | △ | △ | △ | △ |
|  | 0.5 | △ | △ | △ | △ | △ | △ | △ |
| Isopropanol<br>DMSO | 10<br>40 | △ | △ | △ | △ | △ | △ | △ |
| Isopropanol<br>DMSO | 20<br>40 | △ | △ | △ | △ | △ | △ | △ |
| Isopropanol<br>Agent mixture | 10<br>0.1 | △ | △ | △ | △ | △ | △ | △ |
| Isopropanol<br>Agent mixture | 10<br>0.5 | △ | △ | △ | △ | △ | △ | △ |
| Isopropanol<br>Agent mixture | 20<br>0.1 | △ | △ | △ | △ | △ | △ | △ |
| Isopropanol<br>Agent mixture | 20<br>0.5 | 10 | 5 | 5 | △ | 5 | △ | △ |
| DMSO<br>Agent mixture | 40<br>0.1 | △ | △ | △ | △ | △ | △ | △ |

TABLE II—Continued

| Ingredients in composition | Ingredient percent | Agent mixture (A+B) 1:1 | | | | | | |
|---|---|---|---|---|---|---|---|---|
| | | Sta. aureus | E. coli | Pseudomonas | Candida | Epidermophyt. | Aspergillus | Penicillium |
| DMSO | 40 | △ | △ | △ | △ | △ | △ | △ |
| Agent mixture | 0.5 | | | | | | | |
| Isopropanol | 10 | | | | | | | |
| DMSO | 40 | △ | 10 | 10 | △ | 0.5 | △ | △ |
| Agent mixture | 0.1 | | | | | | | |
| Isopropanol | 10 | | | | | | | |
| DMSO | 40 | 0.5 | 0.5 | 0.5 | 0.5 | 0.5 | 10 | 5 |
| Agent mixture | 0.5 | | | | | | | |
| Isopropanol | 20 | | | | | | | |
| DMSO | 40 | 0.5 | 0.5 | 0.5 | 1 | 0.5 | 10 | 5 |
| Agent mixture | 0.1 | | | | | | | |
| Isopropanol | 20 | | | | | | | |
| DMSO | 40 | 0.5 | 0.5 | 0.5 | 0.5 | 0.5 | 0.5 | 0.5 |
| Agent mixture | 0.5 | | | | | | | |

Note.—Statement of killing time in minutes. △=no killing in 10 minutes. Test temperature, 20° C.

TABLE III

| Ingredients in composition | Ingredient percent | Agent mixtures | | | | | |
|---|---|---|---|---|---|---|---|
| | | A+B, 1:1 | | A+B, 4:1 | | A+B, 1:4 | |
| | | Sta. aureus | E. coli | Sta. aureus | E. coli | Sta. aureus | E. coli |
| Isopropanol | 20 | △ | △ | △ | △ | △ | △ |
| Dimethylsulfoxide (DMSO) | 10 | △ | △ | △ | △ | △ | △ |
| | 20 | △ | △ | △ | △ | △ | △ |
| | 30 | △ | △ | △ | △ | △ | △ |
| Agent mixture | 0.5 | △ | △ | △ | △ | △ | △ |
| Isopropanol | 20 | △ | △ | △ | △ | △ | △ |
| DMSO | 10 | | | | | | |
| Isopropanol | 20 | △ | △ | △ | △ | △ | △ |
| DMSO | 20 | | | | | | |
| Isopropanol | 20 | △ | △ | △ | △ | △ | △ |
| DMSO | 30 | | | | | | |
| Isopropanol | 20 | 10 | 5 | 10 | 10 | 10 | 5 |
| Agent mixture | 0.5 | | | | | | |
| DMSO | 10 | △ | △ | △ | △ | △ | △ |
| Agent mixture | 0.5 | | | | | | |
| DMSO | 20 | △ | △ | △ | △ | △ | △ |
| Agent mixture | 0.5 | | | | | | |
| DMSO | 30 | △ | △ | △ | △ | △ | △ |
| Agent mixture | 0.5 | | | | | | |
| Isopropanol | 20 | 5 | 3 | 5 | 5 | 5 | 3 |
| DMSO | 10 | | | | | | |
| Agent mixture | 0.5 | | | | | | |
| Isopropanol | 20 | 3 | 1 | 5 | 1 | 3 | 3 |
| DMSO | 20 | | | | | | |
| Agent mixture | 0.5 | | | | | | |
| Isopropanol | 20 | 0.5 | 0.5 | 1 | 0.5 | 0.5 | 0.5 |
| DMSO | 30 | | | | | | |
| Agent mixture | 0.5 | | | | | | |

Note.—Statement of killing time in minutes. △=no killing time in 10 minutes. Test temperature, 20° C.

TABLE IV

| Ingredient in composition | Ingredient percent | Agent mixture | | |
|---|---|---|---|---|
| | | A+B 2:1 | A+B 1:4 | A+B 1:1 |
| Ethanol | 10 | △ | △ | △ |
| | 20 | △ | △ | △ |
| Dimethylsulfoxide (DMSO) | 40 | △ | △ | △ |
| Agent mixture | 0.5 | △ | △ | △ |
| Ethanol | 10 | | | |
| DMSO | 40 | | | |
| Ethanol | 20 | | | |
| DMSO | 40 | | | |
| Ethanol | 10 | △ | △ | △ |
| Agent mixture | 0.5 | | | |
| Ethanol | 20 | 10 | 10 | 10 |
| Agent mixture | 0.5 | | | |
| DMSO | 40 | △ | △ | △ |
| Agent mixture | 0.5 | | | |
| Ethanol | 10 | | | |
| DMSO | 40 | 3 | 3 | 1 |
| Agent mixture | 0.5 | | | |
| Ethanol | 20 | | | |
| DMSO | 40 | 0.5 | 0.5 | 0.5 |
| Agent mixture | 0.5 | | | |

Note.—Statement of killing time in minutes. △=no killing time in 10 minutes. Test temperature, 20° C.

As can be seen from Tables II to IV, the kill time is drastically shortened by the mixture of carbamates, the alcohol and dimethylsulfoxide as compared to the individual components alone any combination of two of the components which is completely unexpected.

Examples of complexing agents having a calcium carbonate binding capacity of more than 230 mg. per gm. of complexing agent are shown in Table V.

TABLE V

| Complexing agent | | Mg. of calcium Carbonate bound by 1 gm. of agent |
|---|---|---|
| K-1 | 1-hydroxyhexane-1,1-diphosphonic acid | 280 |
| K-2 | α-aminoethane-α,α-diphosphonic acid | 930 |
| K-3 | α-aminopbenzyl-α,α-diphosphonic acid | 1460 |
| | Aminotrimethylenephosphonic acid (Dequest 2000) | 820 |
| | Ethylenediamine tetramethylenephosphonic acid | 860 |
| | Aminodimethylenephosphonic acid N-acetic acid | 850 |
| | Iminodiacetic acid - N-methylenephosphonic acid | 540 |
| | Hydroxyethanediphosphonic acid | 810 |
| | Phosphonic acetic acid | 270 |
| | Citric acid | 328 |
| K-4 | Diethylenetriaminopenta acetic acid (DTPA) | 275 |
| K-5 | 1,2 - cyclohexanediamine - tetra acetic acid (CDTA) | 285 |
| K-6 | Ethylenediamino-tetra acetic acid (EDTA) | 402 |
| K-7 | Nitrilotriacetic acid (NTA) | 578 |
| K-8 | ChelDP(R) (structure with two COOH, two OH phenyl groups linked by -CH-NH-CH₂-CH₂-NH-CH-) | 250 |

The complexing agents listed in Table VI have a calcium carbonate binding capacity below 230 mg. per gm. in the Hampshire test and when used in combination with the carbamates in the test there was no increase in antimicrobic activity.

TABLE VI

| Complexing agent: | Mg. of calcium carbonate per gm. of complexing agent |
|---|---|
| Hydroxymethylphosphonic acid | 1 |
| Mesoxalic acid monohydrate | 6 |
| 1-cysteinhydrochloride monohydrate | 14 |
| Glycolic acid | 45 |
| Tetra sodium pyrophosphate | 125 |
| n-Hexylaminodimethylenephosphonic acid | 160 |
| Sodium tripolyphosphate | 214 |
| Hexamethylenediamino-tetramethylene phosphonic acid | 220 |

ANTIMICROBIC COMPOSITIONS (A) Antimicrobial solution: Parts by weight
  2-bromo-2-nitrobutyl-N-phenylcarbamate ____ 1
  2-bromo-2-nitrobutyl-N-(3,4 - dichlorophenyl)-carbamate ____ 1
  Spirit dil ____ ad 50

(B) Antimicrobial salves:
  (1) 2-Bromo-2-nitrobutyl-N-phenylcarbamate ____ 0.5
    2-Bromo-2-nitrobutyl - N - (3,4-dichlorophenyl-carbamate ____ 0.5
    Vaseline alba ____ Ad 100
  (2) 2 - bromo-2-nitrobutyl - N - phenyl-carbamate ____ 0.5
    2-bromo-2-nitrobutyl-N-(3,4-dichlorophenyl)-carbamate ____ 0.5
    Decyl ester of oleic acid ____ 15
    Colloid dispersion of 90 parts fatty alcohol of 16 to 18 carbon atoms and 10 parts of sodium alcohol sulfate of 16 to 18 carbon atoms ____ 26
    Water ____ 58

(C) Antimicrobial cream: Parts by weight
  Mineral oil ____ 45.9
  Beeswax ____ 5
  Spermaceti ____ 6
  Cetyl alcohol ____ 1
  Lanolin ____ 1
  Water ____ 40
  Perfume ____ 0.1
  2-bromo-2-nitrobutyl-N-phenylcarbamate ____ 0.5
  2-bromo-2-nitrobutyl-N-(3,4 - dichlorophenyl)-carbamate ____ 0.5

(D) Antimicrobial powder: Parts by weight
  2-bromo-2-nitrobutyl-N-phenylcarbamate ____ 0.5
  2-bromo-2-nitrobutyl-N-(3,4-dichlorophenyl)-carbamate ____ 0.5
  Powdered talcum ____ ad 100

(E) Antimicrobial tooth powder:
  Precipitated calcium carbonate ____ 94.7
  Powdered soap ____ 5
  2-bromo-2-nitrobutyl-N-phenylcarbamate ____ 0.15
  2-bromo-2-nitrobutyl-N-(3,4-dichlorophenyl)-carbamate ____ 0.15

(F) Disinfectant hand wash paste:
  Sodium lauryl sulfate ____ 45
  Monoethanolamide of coconut fatty acid ____ 3
  Finely ground pumice stone ____ 48
  Sodium salt of nitrilotriacetic acid ____ 2
  2-bromo-2-nitrobutyl-N-phenylcarbamate ____ 1
  2-bromo-2-nitrobutyl-N-(3,4-dichlorophenyl)-carbamate ____ 1

(G) Antimicrobial scouring agent:
  Dodecylbenzene sulfonate (WAS 30%) ____ 22
  Sodium sulfate ____ 2
  Finely ground pumice stone ____ 7
  Finely ground quartz powder ____ 66
  Nitrilotriacetic acid ____ 2
  2-bromo-2-nitrobutyl-N-phenylcarbamate ____ 0.5
  2-bromo-2-nitrobutyl-N-(3,4-dichlorophenyl)-carbamate ____ 0.5

(H) Antimicrobial washing agent:
  Dodecylbenzene sulfonate ____ 24
  Sodium polyphosphate ____ 44
  Sodium sulfate ____ 14.5
  Sodium silicate ____ 6.5
  2-bromo-2-nitrobutyl-N-phenylcarbamate ____ 0.5
  2-bromo-2-nitrobutyl-N-(3,4-dichlorophenyl)-carbamate ____ 0.5

(I) Antiseptic shampoo:
  Sodium lauryl ether sulfate (27–28% WAS) ____ 42
  Diethanolamide of coconut fatty acid ____ 5
  Ethylendiaminetetracetic acid ____ 0.4
  2-bromo-2-nitrobutyl-N-phenylcarbamate ____ 0.5
  2-bromo-2-nitrobutyl-N-(3,4-dichlorophenyl)-carbamate ____ 0.5
  Aromatic substances ____ 0.1
  Water ____ 51.5

(J) Day cream and lotion:
  2-bromo-2-nitrobutyl-N-phenylcarbamate ____ 0.005
  2-bromo-2-nitrobutyl-N-(3,4-dichlorophenyl)-carbamate ____ 0.005
  Decyl oleate ____ 10
  Vegetable oil ____ 10
  28° Bé. glycerin ____ 4
  Colloid dispersion of 90 parts fatty alcohol of 16 to 18 carbon atoms and 10 parts of sodium lauryl sulfate ____ 15
  Water ____ 60

(K) Shampoo:
  2-bromo-2-nitrobutyl-N-phenylcarbamate ____ 0.005
  2-bromo-2-nitrobutyl-N-(3,4-dichlorophenyl)-carbamate ____ 0.005
  Sodium lauryl ether sulfate (27–28% WAS) ____ 40
  Diethanolamide of coconut fatty acid ____ 6
  Water ____ 54

Parts by weight (L) Emulsion shampoo:
- 2-bromo-2-nitrobutyl-N-phenylcarbamate ___ 0.005
- 2-bromo-2-nitrobutyl-N-(3,4-dichlorophenyl)-carbamate ___ 0.005
- Sodium lauryl sulfate (90% WAS) ___ 10
- Diethanolamide of coconut fatty acid ___ 3
- Ethylenglycol stearate ___ 2
- Sodium chloride ___ 1
- Water ___ 83

(M) Shampoo with egg yolk:
- 2-bromo-2-nitrobutyl-N-phenylcarbamate ___ 0.01
- 2-bromo-2-nitrobutyl-N-(3,4-dichlorophenyl)-carbamate ___ 0.01
- $C_{12}$–$C_{18}$ fatty alcohol sulfate mixture (40% WAS) ___ 44
- Liquid egg yolk ___ 2
- Sodium chloride ___ 0.3
- Water ___ 52.7

(N) Bubble bath:
- 2-bromo-2-nitrobutyl-N-phenylcarbamate ___ 0.005
- 2-bromo-2-nitrobutyl-N-(3,4-dichlorophenyl)-carbamate ___ 0.005
- Sodium lauryl ether sulfate (27–28% WAS) ___ 69
- Diethanolamide of coconut fatty acid ___ 5
- Water ___ 25

(O) Antimicrobial solution:
- 2-bromo-2-nitrobutyl-N-phenylcarbamate ___ 0.25
- 2-bromo-2-nitrobutyl-N-(3,4-dichlorophenyl)-carbamate ___ 0.25
- Isopropanol ___ 20.0
- Dimethylsulfoxide ___ 30.0
- Water ___ 50.0

(P) Hand disinfectant:
- 2-bromo-2-nitrobutyl-N-phenylcarbamate ___ 0.25
- 2-bromo-2-nitrobutyl-N-(3,4-dichlorophenyl)-carbamate ___ 0.25
- Ethanol ___ 20.0
- Dimethylsulfoxide ___ 30.0
- Sodium lauryl sulfate ___ 7.5
- Monoethanolamide of coconut fatty acid ___ 0.5
- Nitrilotriacetic acid ___ 2.0
- Water ___ 40.0

(Q) Disinfectant for instruments:
- 2-bromo-2-nitrobutyl-N-phenylcarbamate ___ 0.25
- 2-bromo-2-nitrobutyl-N-(3,4-dichlorophenyl)-carbamate ___ 0.25
- Isopropanol ___ 20.0
- Dimethylsulfoxide ___ 30.0
- α-Aminoethane-α,α-diphosphonic acid ___ 10.0
- Water ___ 40.0

(R) Antimicrobial tincture:

(Specifically against bacterially overlapping mycosis)

- 2-bromo-2-nitrobutyl-N-phenylcarbamate ___ 0.25
- 2-bromo-2-nitrobutyl-N-(3,4-dichlorophenyl)-carbamate ___ 0.25
- Ethanol ___ 20.0
- Dimethylsulfoxide ___ 40
- Hydrocortisone ___ 0.5
- Water ___ 40.0

(S) Antimicrobial spray:
- 2-bromo-2-nitrobutyl-N-phenylcarbamate ___ 0.25
- 2-bromo-2-nitrobutyl-N-(3,4-dichlorophenyl)-carbamate ___ 0.25
- Isopropanol ___ 25.0
- Dimethylsulfoxide ___ 20.0
- Water ___ 55.0
- Propellent gas ___ 100.0

Various modifications of the compositions and method of the invention may be made without departing from the spirit or scope thereof and it is to be understood that the invention is intended to be limited only as defined in the appended claims.

We claim:

1. An antifungal and anti-bacterial composition consisting essetially of 0.005 to 5.0% by weight of the total composition of a mixture of 2 - bromo-2-nitrobutyl-N-phenylcarbamate and 2 - bromo-2-nitro-butyl-N-(3,4-dichlorophenyl)-carbamate in a weight ratio of 1:4 to 4:1 and an inert carrier.

2. The composition of claim 1 wherein the weight ratio is 1:1.

3. The composition of claim 1 also containing a complex former having a calcium carbonate binding capacity greater than 230 mg. per gram of complex former in a weight ratio of carbamate mixture to complex former of 1:1000 to 50:1, said binding capacity being calculated as 25 times the number of cc. of solution of 44.1 gm. of calcium acetate monohydrate per liter to titrate to turbidity a solution of 2 gm. of complex former and 10 cc. of a 2% sodium carbonate solution diluted to 100 cc. divided by the weight portion of complex former.

4. The composition of claim 1 which also contains 5 to 30% by weight of an alcohol selected from the group consisting of ethanol and isopropanol and 10 to 50% by weight of dimethyl sulfoxide.

5. The composition of claim 4 containing 10 to 20% by weight of the alcohol.

6. The composition of claim 4 containing 20 to 40% by weight of dimethylsulfoxide.

7. The composition of claim 4 wherein the alcohol is isopropanol.

8. The composition of claim 4 wherein the alcohol is ethanol.

9. The method of killing bacteria and fungi which comprises contacting fungi and bacteria with an effective amount of a composition of claim 1 to destroy the bacteria and fungi.

References Cited

UNITED STATES PATENTS

| | | | |
|---|---|---|---|
| 2,951,786 | 9/1960 | Pullen et al. | 424—300 |
| 3,253,904 | 5/1966 | Harrison | 260—471C |
| 3,384,539 | 5/1968 | Mocotte | 424—300 |

OTHER REFERENCES

Crown Zellerbach, "Product Information Bulletin" Aug. 1961 pp. 1 and 5.

ALBERT T. MEYERS, Primary Examiner

V. D. TURNER, Assistant Examiner

U.S. Cl. X.R.

424—211, 223, 300